United States Patent
Hasegawa et al.

(10) Patent No.: US 10,370,737 B2
(45) Date of Patent: Aug. 6, 2019

(54) HIGH-STRENGTH GALVANIZED STEEL SHEET

(71) Applicant: JFE STEEL CORPORATION, Tokyo (JP)

(72) Inventors: Hiroshi Hasegawa, Fukuyama (JP); Hideyuki Kimura, Fukuyama (JP); Yoshimasa Funakawa, Chiba (JP); Yoichi Makimizu, Fukuyama (JP); Yoshitsugu Suzuki, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 15/543,271

(22) PCT Filed: Nov. 24, 2015

(86) PCT No.: PCT/JP2015/005820
§ 371 (c)(1),
(2) Date: Jul. 13, 2017

(87) PCT Pub. No.: WO2016/113788
PCT Pub. Date: Jul. 21, 2016

(65) Prior Publication Data
US 2018/0030564 A1 Feb. 1, 2018

(30) Foreign Application Priority Data

Jan. 15, 2015 (JP) ................. 2015-005872

(51) Int. Cl.
*C21D 9/46* (2006.01)
*C21D 8/02* (2006.01)
(Continued)

(52) U.S. Cl.
CPC .............. *C21D 9/46* (2013.01); *B32B 15/013* (2013.01); *B32B 15/04* (2013.01); *B32B 15/043* (2013.01); *B32B 15/18* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0463* (2013.01); *C21D 8/0473* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/24* (2013.01); *C22C 38/26* (2013.01); *C22C 38/38* (2013.01); *C22C 38/58* (2013.01); *C23C 2/02* (2013.01); *C23C 2/06* (2013.01); *C23C 2/12* (2013.01); *C23C 2/28* (2013.01);
(Continued)

(58) Field of Classification Search
CPC .... C23C 2/02; C23C 2/28; C23C 2/40; C23C 2/06; C23C 2/12; C23C 2/285; C23C 30/00; C23C 30/005; C21D 2211/008; C21D 9/46; C21D 6/005; C21D 6/002; C21D 8/0205; C21D 6/001; C21D 6/008; C21D 8/0226; C21D 8/0236; C21D 8/0263; C21D 8/0273; C21D 2211/001; C21D 2211/005; C21D 8/0463; C21D 8/0473; C22C 38/00; C22C 38/14; C22C 38/58; C22C 38/002; C22C 38/001; C22C 38/005; C22C 38/02; C22C 38/04; C22C 38/06; C22C 38/08; C22C 38/12; C22C 38/16; C22C 38/24; C22C 38/26; C22C 38/38; B32B 15/013; B32B 15/04; B32B 15/043; B32B 15/18; Y10T 428/12799; Y10T 428/12757; Y10T 428/12951; Y10T 428/12958; Y10T 428/12972
See application file for complete search history.

(56) References Cited

U.S. PATENT DOCUMENTS

| | | |
|---|---|---|
| 2003/0106622 A1 | 6/2003 | Matsuoka et al. |
| 2011/0139315 A1 | 6/2011 | Nakagaito et al. |
| 2018/0030564 A1 | 2/2018 | Hasegawa et al. |

FOREIGN PATENT DOCUMENTS

| | | |
|---|---|---|
| CN | 1358236 A | 7/2002 |
| CN | 101932744 A | 12/2010 |

(Continued)

OTHER PUBLICATIONS

Machine Translation, Murakami et al., JP 2013-040383, Feb. 2013. (Year: 2013).*

(Continued)

*Primary Examiner* — Michael E. La Villa
(74) *Attorney, Agent, or Firm* — Oliff PLC

(57) ABSTRACT

A high-strength galvanized steel sheet and method for producing the same. The high-strength galvanized steel sheet including a specified chemical composition and a microstructure comprising, in terms of area fraction, a tempered martensite phase: 30% or more and 73% or less, a ferrite phase: 25% or more and 68% or less, a retained austenite phase: 2% or more and 15% or less, and other phases: 10% or less (including 0%), the other phases comprising a martensite phase: 3% or less (including 0%) and a bainitic ferrite phase: less than 5% (including 0%), the tempered martensite phase having an average grain size of 8 μm or less, the ferrite phase having an average grain size of 5 μm or less, and the retained austenite phase having a C content less than 0.7% by mass.

8 Claims, No Drawings

(51) Int. Cl.
- *C21D 6/00* (2006.01)
- *C22C 38/26* (2006.01)
- *C22C 38/24* (2006.01)
- *C22C 38/16* (2006.01)
- *C22C 38/14* (2006.01)
- *C22C 38/12* (2006.01)
- *C22C 38/08* (2006.01)
- *C22C 38/06* (2006.01)
- *C22C 38/02* (2006.01)
- *C22C 38/00* (2006.01)
- *C22C 38/38* (2006.01)
- *C23C 2/06* (2006.01)
- *C23C 2/28* (2006.01)
- *C23C 2/40* (2006.01)
- *B32B 15/01* (2006.01)
- *C23C 30/00* (2006.01)
- *C23C 2/12* (2006.01)
- *B32B 15/18* (2006.01)
- *B32B 15/04* (2006.01)
- *C23C 2/02* (2006.01)
- *C22C 38/58* (2006.01)
- *C22C 38/04* (2006.01)
- *C21D 8/04* (2006.01)

(52) U.S. Cl.
CPC ............... *C23C 2/285* (2013.01); *C23C 2/40* (2013.01); *C23C 30/00* (2013.01); *C23C 30/005* (2013.01); *C21D 2211/001* (2013.01); *C21D 2211/005* (2013.01); *C21D 2211/008* (2013.01); *Y10T 428/12757* (2015.01); *Y10T 428/12799* (2015.01); *Y10T 428/12951* (2015.01); *Y10T 428/12958* (2015.01); *Y10T 428/12972* (2015.01)

(56) References Cited

FOREIGN PATENT DOCUMENTS

| | | |
|---|---|---|
| EP | 1 191 115 A1 | 3/2002 |
| EP | 1 504 134 B1 | 5/2007 |
| EP | 2 258 886 A1 | 12/2010 |
| EP | 2 910 662 A1 | 8/2015 |
| JP | 2001-192768 A | 7/2001 |
| JP | 2003-13177 A | 1/2003 |
| JP | 2007-016319 A | 1/2007 |
| JP | 2008-291304 A | 12/2008 |
| JP | 2009-203548 A | 9/2009 |
| JP | 2009-270126 A | 11/2009 |
| JP | 2010-196115 A | 9/2010 |
| JP | 2010-275627 A | 12/2010 |
| JP | 2013-40383 A | 2/2013 |
| JP | 5493986 B2 | 5/2014 |
| KR | 100747133 B1 | 8/2007 |
| WO | 2014061270 A1 | 4/2014 |

OTHER PUBLICATIONS

Mar. 1, 2016 Search Report issued in International Patent Application No. PCT/JP2015/005820.
Feb. 24, 2018 Office Action issued in Chinese Patent Application No. 201580073317.0.
Jul. 1, 2018 Office Action issued in Korean Patent Application No. 10-2017-7017986.
Nov. 3, 2017 Search Report issued European Patent Application No. 15877745.8.
Oct. 1, 2018 Office Action issued in U.S. Appl. No. 15/543,062.
Mar. 15, 2019 Office Action issued in U.S. Appl. No. 15/543,062.

* cited by examiner

US 10,370,737 B2

HIGH-STRENGTH GALVANIZED STEEL SHEET

TECHNICAL FIELD

This application relates to a high-strength galvanized steel sheet and a method for producing the high-strength galvanized steel sheet. The high-strength galvanized steel sheet of the disclosed embodiments is suitably used as a steel sheet for automobiles.

BACKGROUND

To reduce the amount of $CO_2$ emission in view of global environmental conservation, an improvement in the fuel consumption of automobiles by reducing the weight of automobile bodies while maintaining the strength of automobile bodies is always an important issue in the automobile industry. In order to reduce the weight of automobile bodies while maintaining the strength thereof, it is effective to reduce the thickness of a steel sheet used as a material of automobile parts by increasing the strength of the steel sheet. Meanwhile, many of automobile parts composed of steel sheets are formed by press working, burring working, or the like. Therefore, it is desired that a high-strength galvanized steel sheets used as materials for automobile parts have excellent d formability in addition to desired strength.

In recent years, high-strength galvanized steel sheets having a tensile strength (TS) of 1180 MPa or more have been increasingly used as materials for automobile body frames. High-strength galvanized steel sheets are required to have good bendability, good ductility, and in particular, good uniform elongation for the formation thereof. Parts composed of high-strength galvanized steel sheets are required to have high yield strength and high impact resistance in view of crashworthiness, and it is extremely important to achieve all these properties. Various high-strength galvanized steel sheets have been developed under these circumstances.

Patent Literature 1 discloses a high-strength galvanized steel sheet having good bendability owing to the control of precipitates and a technology, as a method for producing thereof, for controlling the cooling rate of molten steel prior to solidification, an annealing temperature during annealing, and a subsequent cooling rate.

Patent Literature 2 discloses a high-strength galvanized steel sheet having good ductility and good bendability owing to the control of the balance between Si and Al, retained γ, and the Vickers hardness of portion directly below a surface, and a technology, as a method for producing thereof, for controlling a finishing temperature, a coiling temperature, an annealing temperature range, a cooling rate after annealing, a cooling stop temperature, and a cooling stop holding time.

CITATION LIST

Patent Literature

PTL 1: Japanese Unexamined Patent Application Publication No. 2007-16319
PTL 2: Japanese Unexamined Patent Application Publication No. 2009-270126

SUMMARY

Technical Problem

In the technology described in Patent Literature 1, a precipitation hardened steel has high yield strength (YS) and low uniform elongation (UEL). There is no information about the steel in the range of a tensile strength (TS) of 1180 MPa or more. Impact resistance is also not taken into account. There is no information about an improvement in the properties of the material by performing annealing multiple times.

In the technology described in Patent Literature 2, the steel has a low tensile strength (TS) of less than 900 MPa. Impact resistance is not taken into account, and there is room for improvement therein. Furthermore, there is no information about an improvement in the properties of the material by performing annealing multiple times.

The disclosed embodiments have been accomplished in light of the foregoing problems in the related art. It is an object of the disclosed embodiments to provide a high-strength galvanized steel sheet having a tensile strength (TS) of 1180 MPa or more, high yield strength (YS), excellent in uniform elongation, bendability and impact resistance, and a method for producing the high-strength galvanized steel sheet.

Solution to Problem

To overcome the foregoing problems and produce a galvanized steel sheet excellent in uniform elongation, good bendability, and impact resistance while maintaining high strength, the inventors have conducted intensive studies from the viewpoint of the chemical composition and the microstructure of the steel sheet and a method for producing the steel sheet, and have found the following.

A tensile strength (TS) of 1180 MPa or more, a yield strength (YS) of 850 MPa or more, a uniform elongation of 6.5% or more, excellent bendability, and excellent impact resistance can be achieved by allowing a galvanized steel sheet to contain, by mass %, C: 0.15% or more and 0.25% or less, Si: 0.50% or more and 2.5% or less, Mn: 2.3% or more and 4.0% or less, Al: 0.01% or more and 2.5% or less, and at least one selected from Nb: 0.005% or more and 0.1% or less, Ti: 0.005% or more and 0.1% or less, V: 0.01% or more and 1.0% or less, and Mo: 0.005% or more and 2.0% or less; and performing hot rolling, cold rolling, and annealing under appropriate conditions to allow the galvanized steel sheet to contain, in terms of area fraction, a tempered martensite phase: 30% or more and 73% or less, a ferrite phase: 25% or more and 68% or less, a retained austenite phase: 2% or more and 15% or less, and other phases: 10% or less (including 0%), the other phases containing a martensite phase: 3% or less (including 0%) and a bainitic ferrite phase: less than 5% (including 0%), in which the tempered martensite phase having an average grain size of 8 μm or less, the ferrite phase having an average grain size of 5 μm or less, and the retained austenite phase having a C content of less than 0.7% by mass.

The disclosed embodiments have been made on the basis of these findings. The gist of the disclosed embodiments is described below.

[1] A high-strength galvanized steel sheet has a chemical composition containing, by mass %, C: 0.15% or more and 0.25% or less, Si: 0.50% or more and 2.5% or less, Mn: 2.3% or more and 4.0% or less, P: 0.100% or less, S: 0.02% or less, Al: 0.01% or more and 2.5% or less, at least one element selected from Nb: 0.005% or more and 0.1% or less, Ti: 0.005% or more and 0.1% or less, V: 0.01% or more and 1.0% or less, and Mo: 0.005% or more and 2.0% or less, and the balance being Fe and inevitable impurities; and a steel-sheet microstructure containing, in terms of area fraction, a tempered martensite phase: 30% or more and 73% or less, a ferrite phase: 25% or more and 68% or less, a retained austenite phase: 2% or more and 15% or less, and other phases: 10% or less (including 0%), the other phases containing a martensite phase: 3% or less (including 0%) and a bainitic ferrite phase: less than 5% (including 0%), the tempered martensite phase having an average grain size of 8 μm or less, the ferrite phase having an average grain size of 5 μm or less, and the retained austenite phase having a C content less than 0.7% by mass.

[2] In the high-strength galvanized steel sheet described in [1], the chemical composition further contains, by mass %, at least one element selected from Cr: 0.01% or more and 2.0% or less, Ni: 0.01% or more and 2.0% or less, and Cu: 0.01% or more and 2.0% or less.

[3] In the high-strength galvanized steel sheet described in [1] or [2], the chemical composition further contains, by mass %, B: 0.0002% or more and 0.0050% or less.

[4] In the high-strength galvanized steel sheet described in any one of [1] to [3], the chemical composition further contains, by mass %, at least one element selected from Ca: 0.001% or more and 0.005% or less and REM: 0.001% or more and 0.005% or less.

[5] In the high-strength galvanized steel sheet described in any one of [1] to [4], the galvanized steel sheet includes a galvannealed steel sheet.

[6] In the high-strength galvanized steel sheet described in any one of [1] to [5], the galvanized steel sheet has a tensile strength of 1180 MPa or more.

[7] A method for producing a high-strength galvanized steel sheet includes:

a hot-rolling step of allowing a slab having the chemical composition described in any of [1] to [4] to have a temperature of 1100° C. or higher, hot-rolling the slab at a finish rolling temperature of 800° C. or higher to produce a hot-rolled steel sheet, and coiling the hot-rolled steel sheet at a coiling temperature of 550° C. or lower;

a primary annealing step of heating the hot-rolled steel sheet to an annealing temperature (T1) of ($Ac_1$–20° C.) or higher and $Ac_3$ or lower, holding the hot-rolled steel sheet at the annealing temperature for 10 minutes or more, and cooling the hot-rolled steel sheet to room temperature;

a cold-rolling step of cold-rolling the hot-rolled steel sheet that has been subjected to primary annealing at a cumulative rolling reduction of more than 20% to produce a cold-rolled steel sheet;

a secondary annealing step of heating the cold-rolled steel sheet to an annealing temperature (T2) higher than $Ac_1$ and $Ac_3$ or lower (provided that T2 >T1) at an average heating rate of 10° C./s or less, holding the cold-rolled steel sheet at the annealing temperature for 30 s or more and 600 s or less, cooling the cold-rolled steel sheet to a cooling stop temperature of 460° C. or higher and 550° C. or lower at an average cooling rate of 1.0° C./s or more, and holding the cold-rolled steel sheet at the cooling stop temperature for 500 s or less;

a galvanization step of galvanizing the cold-rolled steel sheet that has been subjected to secondary annealing and cooling the galvanized cold-rolled steel sheet to room temperature; and a tempering step of tempering the galvanized cold-rolled steel sheet at a tempering temperature of 50° C. or higher and 400° C. or lower.

[8] in the method for producing a high-strength galvanized steel sheet described in [7], the galvanization step includes after the galvanization, galvannealing treatment in which the galvanized cold-rolled steel sheet is held in a temperature range of 460° C. or higher and 580° C. or lower for 1 s or more and 120 s or less and then cooled to room temperature.

[9] The method for producing a high-strength galvanized steel sheet described in [7] or [8] further includes before and/or after the tempering step, a temper-rolling step of performing tempering at an elongation rate of 0.05% or more and 1.00% or less.

It should be noted that in the disclosed embodiments, the "high-strength galvanized steel sheet" refers to a steel sheet having a tensile strength of 1130 MPa or more and includes a galvannealed steel sheet in addition to a galvanized steel sheet. Furthermore, galvanizing includes galvannealing in addition to galvanizing. In the case where a galvanized steel sheet and a galvannealed steel sheet need to be distinctively explained, these steel sheets are distinctively described.

Advantageous Effects

According to the disclosed embodiments, it is possible to obtain a high-strength galvanized steel sheet having a tensile strength (TS) of 1180 MPa or more, a high yield strength (YS) of 850 MPa or more, a uniform elongation of 6.5% or more, good bendability in which when the steel sheet is bent at a bending radius of 2.0 mm, the length of a crack is less than 0.5 mm, and excellent impact resistance. The high-strength galvanized steel sheet is suitable as a material for automobile parts.

DETAILED DESCRIPTION

The disclosed embodiments will be described in detail below. The symbol "%" that expresses the content of a chemical element refers to "% by mass" unless otherwise specified.

1) Chemical Composition

C: 0.15% or More and 0.25% or Less

C is an element needed to form a martensite phase or increase the hardness of a martensite phase to increase tensile strength (TS). Furthermore, C is an element needed to stabilize a retained austenite phase to obtain uniform elongation. When the C content Is less than 0.15%, the martensite phase has low strength, and the retained austenite phase is insufficiently stabilized. It is thus difficult to achieve both a tensile strength (TS) of 1180 MPa or more and a uniform elongation of 6.5% or more. When the C content is more than 0.25%, bendability markedly degrads. Accordingly, the C content is 0.15% or more and 0.25% or less. He lower limit is preferably 0.16% or more. The upper limit is preferably 0.22% or less.

Si: 0.50% or More and 2.5% or Less

Si is an element effective in increasing the tensile strength (TS) of steel by solid-solution strengthening. Furthermore, Si is an element effective in inhibiting the formation of cementite to provide a retained austenite phase. To achieve these effects, it is necessary to set the Si content to be 0.50% or more. An increase in Si content leads to the excessive formation of a ferrite phase to cause the degradation of the bendability, the coatability, and the weldability. Thus, an appropriate addition is preferred. Accordingly, the Si content is 0.50% or more and 2.5% or less, preferably 0.50% or more and 2.0% or less, and more preferably 0.50% or more and 1.8% or less.

Mn: 2.3% or More and 4.0% or Less

Mn is an element that increases the tensile strength (TS) of steel by solid-solution strengthening, that inhibits ferrite transformation and bairite transformation, and that forms a martensite phase to increase the tensile strength (TS). Furthermore, Mn is an element that stabilizes an austenite phase to increase uniform elongation. To sufficiently provide these effects, the Mn content needs to be 2.3% or more. When the Mn content is more than 4.0%, inclusions increase significantly to cause the degradation of the bendability. Accordingly, the Mn content is 2.3% or more and 4.0% or less. The Mn content is preferably 2.3% or more and 3.8% or less and more preferably 2.3% or more and 3.5% or more in view of the tensile strength (TS) and the bendability.

P: 0.100% or Less

P is desirably minimized as much as possible because the bendability and the weldability are degraded by grain boundary segregation. The allowable upper limit of the P content in the disclosed embodiments is 0.100%. The P content is preferably 0.050% or less and more preferably 0.020% or less. The lower limit is not particularly specified and preferably 0.001% or more because the P content of less than 0.001% leads to a reduction in production efficiency.

S: 0.02% or Less

S is present in the form of inclusions such as MnS and degrades weldability. Thus, the S content is preferably minimized as much as possible. The allowable upper limit of the S content in the disclosed embodiments is 0.02%. The S content is preferably 0.0040% or less. The lower limit is not particularly specified and is preferably 0.0005% or more because the S content of less than 0.0005% leads to a reduction in production efficiency.

Al: 0.01% or More and 2.5% or Less

Al is an element effective in stabilizing an austenite phase to obtain a retained austenite phase. When the Al content is less than 0.01%, it is not possible to stabilize the austenite phase to obtain the retained austenite phase. When the Al content is more than 2.5%, a risk of slab cracking during the continuous casting increases and a ferrite phase is excessively formed during annealing. It is thus difficult to achieve both a tensile strength (TS) of 1180 MPa or more and good bendability. Accordingly, the Al content is 0.01% or more and 2.5% or less. The Al content is preferably 0.01% or more and 1.0% or less and more preferably 0.01% or more and 0.6% or less from the viewpoint of inhibiting the excessive formation of the ferrite phase.

At least one element selected from Nb: 0.005% or more and 0.1% or less, Ti: 0.005% or more and 0.1% or less, V: 0.01% or more and 1.0% or less, and Mo: 0.005% or more and 2.0% or less Nb, Ti, V, and Mo form carbides during a primary annealing step after a hot-rolling step and are remained during a secondary annealing step after a cold-rolling step to inhibit the grain growth of a ferrite phase, thereby resulting in a fine ferrite phase. To provide the effect, it is necessary to contain any of Nb: 0.005% or more, Ti: 0.005% or more, V: 0.01% or more, and Mo: 0.005% or more. When any of Nb: more than 0.1%, Ti: more than 0.1%, V: more than 1.0%, and Mo: more than 2.0% is satisfied, a coarse carbide is formed to reduce the effect of inhibiting the grain growth of the ferrite phase. Accordingly, it is necessary to contain at least one element selected from Nb: 0.005% or more and 0.1% or less, Ti: 0.005% or more 0.1% or less, V: 0.01% or more and 1.0% or less, and Mo: 0.005% or more and 2.0% or less.

The upper limit of the Nb content is preferably 0.080% or less. The upper limit of the Ti content is preferably 0.060% or less The upper limit of the V content is preferably 0.60% or less. The upper limit of the Mo content is preferably 0.80% or less. The lower limit of the Mo content is preferably 0.030% or more.

The balance is Fe and inevitable impurities. One or more elements described below may be appropriately contained therein, as needed.

At least one element selected from Cr: 0.01% or more and 2.0% or less, Ni: 0.01% or more and 2.0% or less, and Cu: 0.01% or more and 2.0% or less Cr, Ni, and Cu are elements that form low-temperature transformation phases such as a martensite phase and thus are effective in increasing strength. To provide the effect, the content of at least one element selected from Cr, Ni, and Cu is 0.01% or more. When the content of each of Cr, Ni, and Cu is more than 2.0%, the effect is saturated. Accordingly, when these elements are contained, the content of each of Cr, Ni, and Cu is 0.01% or more and 2.0% or less. The lower limit of the content of each of the elements is preferably 0.1% or more. The upper limit is preferably 1.0% or less.

B: 0.0002% or More and 0.0050% or Less

B is an element that segregates to grain boundaries and thus is effective in inhibiting the formation of a ferrite phase and a bainite phase to promote the formation of a martensite phase. To sufficiently provide the effects, the B content is 0.0002% or more. When the B content is more than 0.0050%, the effects are saturated to lead to cost increases. Accordingly, when B is contained, the B content is 0.0002% or more and 0.0050% or less. The lower limit of the B content is preferably 0.0005% or more in view of the formation of the martensite phase. The upper limit is preferably 0.0030% or less and more preferably 0.0020% or less.

At least one element selected from Ca: 0.001% or more and 0.005% or less and REM: 0.001% or more and 0.005% or less Ca and REM are elements effective in controlling the form of sulfides to improve formability. To provide the effect, the content of at least one element selected from Ca and REM is 0.001% or more. When each of the Ca content and the REM content is more than 0.005%, the cleanliness of steel might be adversely affected to degrade the properties. Accordingly, when these elements are contained, the content of each of Ca and REM is 0.001% or more and 0.005% or less.

2) Microstructure of Steel Sheet

Area Fraction of Tempered Martensite Phase: 30% or More and 73% or Less

When the area fraction of a tempered martensite phase is less than 30%, it is difficult to achieve both a high tensile strength (TS) of 1180 MPa or more and high bendability. When the area fraction of a tempered martensite phase is more than 73%, uniform elongation of the disclosed embodiments is not provided. Accordingly, the area fraction of the tempered martensite phase is 30% or more and 73% or less. The lower limit of the area fraction is preferably 40% or more. The upper limit is preferably 70% or less and more preferably 65% or less.

Area Fraction of Ferrite Phase: 25% or More and 68% or Less

When the area fraction of a ferrite phase is less than 25%, it is difficult to obtain a uniform elongation of 6.5% or more. When the area fraction of the ferrite phase is more than 68%, the yield strength (YS) of the disclosed embodiments is not obtained. Accordingly, the area fraction of the ferrite is 25% or more and 68% or less and preferably 35% or more and 68% or less. An unrecrystallized ferrite phase, which is undesirable for the ductility and the bendability, is not included in the ferrite phase in the disclosed embodiments.

Area Fraction of Retained Austenite Phase: 2% or More and 15% or Less

When the area fraction of a retained austenite phase is less than 2%, it is difficult to achieve both a high tensile strength (TS) of 1180 MPa or more and a uniform elongation of 6.5% or more. When the area fraction of the retained austenite phase is more than 15%, the bendability is degraded. Accordingly, the area fraction of the retained austenite phase is 2% or more and 15% or less and preferably 3% or more and 15% or less.

The microstructure of the steel sheet of the disclosed embodiments may be composed of three phases: a tempered martensite phase, a ferrite phase, and a retained austenite phase. Other phases may be allowable as long as the area fraction of the other phases is 10% or less. Because the other phases are undesirable for the bendability and the impact resistance, the area fraction of the other phases is 10% or less, preferably less than 5%, and more preferably less than 3%. Examples of the other phases include a martensite phase, a bainitic ferrite phase, a pearlite phase, and an unrecrystallized ferrite phase.

Regarding the other phases, the allowable area fraction of each of the martensite phase and the bainitic ferrite phase is specified from the following reasons.

Area Fraction of Martensite Phase: 3% or Less (Including 0%)

When the area fraction of the martensite phase is more than 3%, the bendability and the impact resistance are markedly degraded. Accordingly, the area fraction of the martensite phase is 3% or less, preferably 2% or less, and more preferably 1% or less.

Area Fraction of Bainitic Ferrite Phase: Less Than 5% (Including 0%)

When the area fraction of the bainitic ferrite phase is 5% or more, it is difficult to achieve both a high tensile strength (TS) of 1180 MPa or more and a uniform elongation of 6.5% or more. Accordingly, the area fraction of the bainitic ferrite phase is less than 5%.

Average Grain Size of Tempered Martensite Phase: 8 μm or Less

When the average grain size of the tempered martensite phase is more than 8 μm, the bendability is markedly degraded. Accordingly, the average grain size of the tempered martensite phase is 8 μm or less. The average grain size is preferably 4 μm or less. Note that the grains of the tempered martensite phase in the disclosed embodiments refer to grains of a tempered martensite phase surrounded by grain boundaries of a prior austenite phase or grain boundaries of a tempered martensite phase and other phases, such as a ferrite phase and a bainitic ferrite phase, and does not include a packet boundary or block boundary in the tempered martensite phase.

Average Grain Size of Ferrite Phase: 5 μm or Less

When the average grain size of the ferrite phase is more than 5 μm, the impact resistance is markedly degraded. Accordingly, the average grain size of the ferrite phase is 5 μm or less.

C: Content of Retained Austenite Phase: Less Than 0.7% by Mass

When the C content of the retained austenite phase is 0.7% by mass or more, the retained austenite phase is excessively stable. It is thus difficult to achieve both a high tensile strength (TS) of 1180 MPa or more and a uniform elongation of 6.5% or more. Accordingly, the C content of the retained austenite phase is less than 0.7%. The C content of the retained austenite phase in the disclosed embodiments is a value determined by X-ray diffraction.

The area fraction at each of the martensite phase, the tempered martensite phase, the ferrite phase, the bainitic ferrite phase, the pearlite phase, and the unrecrystallized ferrite phase in the disclosed embodiments refers to the percentage of the area of the corresponding phase with respect to an observed area. The area fraction of each phase is determined by cutting samples from a steel sheet that has been subjected to a final production step, polishing a section parallel to a rolling direction, etching the section with a 3% nital, capturing images of three fields of view, for each sample, of a portion of the steel sheet below a zinc coat using a scanning electron microscope (SEM) at a magnification of ×1500, the portion being located away from a surface of the steel sheet by ¼ of the sheet thickness of the steel sheet, determining the area fraction of each phase from the resulting image data using Image-Pro from Media Cybernetics, Inc., and defining the average area fraction of each phase in the fields of view as the area fraction of each phase. The phases can be distinguished from each other in the image data as follows: the ferrite phase appears black, the martensite phase appears white and does not include a carbide, a tempered martensite phase appears gray and includes a carbide, the bainitic ferrite phase appears dark gray and includes a carbide or a martensite island phase, and the pearlite appears as black-and-white layers. The unrecrystallized ferrite phase appears black, includes sub-boundaries, and thus is distinguished from the ferrite phase. Because the martensite island phase is regarded as a tempered martensite phase in the disclosed embodiments, the area fraction of the tempered martensite phase includes the area fraction of the martensite island phase.

The average grain size of each of the tempered martensite phase and the ferrite phase is determined as follows: The total area of the tempered martensite phase or the ferrite phase in the fields of view in the image data used for the determination of the area fraction is divided by the number of the tempered martensite phase or the ferrite phase to determine the average area. The square root of the average area is defined as the average grain size of each phase.

The area fraction of the retained austenite phase is determined as follows: A steel sheet that has been subjected to a final production step is ground in such a manner that a portion of the steel sheet below the zinc coat, the portion being located away from a surface of the steel sheet by ¼ of the sheet thickness of the steel sheet, is a measurement surface. The steel sheet is further polished to a depth of 0.1 mm by chemical polishing. In the measurement surface located away from the surface of the steel sheet by ¼ of the sheet thickness, the integrated intensities of reflections from the (200), (220), and (311) planes of fcc iron (austenite phase) and the (200), (211), and (220) planes of bcc iron (ferrite phase) are measured with an X-ray diffractometer using MoKα radiation. The volume percentage is determined from the intensity ratio of the integrated intensity of reflection from the planes of fcc iron (austenite phase) to the integrated intensity of reflection from the planes of bcc iron (ferrite phase). The value of the volume fraction is used as a value of the area fraction. The C content of the retained austenite phase is calculated from the amount of shift of a diffraction peak corresponding to the (220) plane measured with X-ray diffractometer using CoKα radiation by means of the following expression:

$$a = 1.7889 \times (2)^{1/2} / \sin\theta$$

$$a = 3.578 + 0.033[C] + 0.00095[Mn] + 0.0006[Cr] + 0.022[N] + 0.0056[Al] + 0.0015[Cu] + 0.0031[Mo]$$

where $a$ represents the lattice constant (Å) of the austenite phase, $\theta$ represents a value obtained by dividing the diffraction peak angle (rad) corresponding to the (220) plane by 2, and [M] represents the content (% by mass) of an element M in the austenite phase (an element that is not contained is zero). The content (% by mass) of the element M in the retained austenite phase in the disclosed embodiments is content with respect to the entire steel.

3) Applications and So Forth of Steel Sheet

Applications of the high-strength galvanized steel sheet of the disclosed embodiments are not particularly limited. The high-strength galvanized steel sheet is preferably used for automobile parts.

The thickness (excluding the coat) of the high-strength galvanized steel sheet of the disclosed embodiments is not particularly limited and is preferably 0.4 mm or more and 3.0 mm or less.

4) Production Conditions

The high-strength galvanized steel sheet of the disclosed embodiments may be produced by, for example, a production method including a hot-rolling step of heating a slab having the foregoing chemical composition to a temperature of 1100° C. or higher, hot-rolling the slab at a finish rolling temperature of 800° C. or higher to produce a hot-rolled steel sheet, and coiling the hot-rolled steel sheet at a coiling temperature of 550° C. or lower; a primary annealing step of heating the hot-rolled steel sheet to an annealing temperature (T1) of ($Ac_1$−20° C.) or higher and $Ac_3$ lower, holding the hot-rolled steel sheet at the annealing temperature for 10 minutes or more, and cooling the hot-rolled steel sheet to room temperature; a cold-rolling step of cold-rolling the hot-rolled steel sheet subjected to primary annealing at a cumulative rolling reduction of more than 20% to produce a cold-rolled steel sheet; a secondary annealing step of heating the cold-rolled steel sheet to an annealing temperature (T2) higher than $Ac_1$ and $Ac_3$ or lower (provided that T2 >T1) at an average heating rate of 10° C./s or less, holding the cold-rolled steel sheet at the annealing temperature for 30 s or more and 600 s or less, cooling the cold-rolled steel sheet to a cooling stop temperature of 460° C. or higher and 550° C. or lower at an average cooling rate of 1.0° C./s or more, and holding the cold-rolled steel sheet at the cooling stop temperature for 500 s or less; a galvanization step of galvanizing the cold-rolled steel sheet subjected to secondary annealing and, optionally, further heating the galvanized cold-rolled steel sheet to 460° C. to 580° C. to perform galvannealing treatment, and cooling the galvanized cold-rolled steel sheet to room temperature; and a tempering step of tempering the galvanized cold-rolled steel sheet at a tempering temperature of 50° C. or higher and 400° C. or lower.

4-1) Hot-rolling Step

Slab Temperature: 1100° C. or Higher

The slab temperature of lower than 1100° C. results in an unmelted carbide, thereby failing to obtain the microstructure of the steel sheet of the disclosed embodiments. Accordingly, the slab temperature is 1100° C. or higher. To suppress an increase in scale loss, the heating temperature of the slab is preferably 1300° C. or lower. In the hot-rolling step of the disclosed embodiments, the temperature of a material, such as a slab, to be rolled refers to the surface temperature of a portion of the material, such as a slab, to be rolled, the portion being located in the middle of the material in the longitudinal and transverse directions.

The slab is preferably produced by a continuous casting process to prevent macro-segregation and may also be produced by an ingot-making process or a thin slab casting process. To hot-rolling the slab, the slab may be temporarily cooled to room temperature, reheated, and subjected to hot rolling. The slab may be placed in a heating furnace without cooling to room temperature to perform hot rolling. An energy-saving process may be employed in which hot rolling is performed immediately after the slab is slightly heated.

Finish Rolling Temperature: 800° C. or Higher

When the finish rolling temperature is lower than 800° C., because a ferrite phase and so forth is formed, rolling is performed in a two-phase region to form a nonuniform microstructure of the steel sheet, thereby failing to obtain the microstructure of the steel sheet of the disclosed embodiments. Accordingly, the finish rolling temperature is 800° C. or higher. The upper limit of the finish rolling temperature is not particularly limited and is preferably 950° C. or lower.

When the slab is hot-rolled, a rough bar after rough rolling may be heated in order to prevent the occurrence of a trouble even if the heating temperature of the slab is reduced. A continuous roiling process may also be employed in which rough bars are joined together and finish rolling is continuously performed.

To reduce the rolling load and uniformize the shape and the material properties, all or some passes of the finish rolling is preferably replaced with lubrication rolling at a coefficient of friction of 0.10 to 0.25.

Coiling Temperature: 550° C. or Lower

When the coiling temperature is higher than 550° C., soft phases, such as a ferrite phase and a pearlite phase are formed in a hot-rolled coil, thus failing to obtain the microstructure of the steel sheet of the disclosed embodiments. Accordingly, the coiling temperature is 550° C. or lower. The lower limit is not particularly specified and is preferably 400° C. or higher because a coiling temperature lower than 400° C. results in the degradation of the shape of the steel sheet.

The hot-rolled steel sheet that has been coiled is subjected to pickling to remove scales. Then the hot-rolled steel sheet is subjected to primary annealing, cold rolling, secondary annealing, galvanization, tempering, and so forth under conditions described below.

The microstructure is formed through a primary annealing step, a cold-rolling step, a secondary annealing step, and a tempering step in the disclosed embodiments. The primary annealing step is performed at a low temperature to lead to the formation of a ferrite phase and an austenite phase, the concentration of elements from the ferrite phase to the austenite phase, and the precipitation of Nb—, Ti—, V—, and Mo-based carbides. In the secondary annealing step after the cold rolling, the presence of the carbides inhibits the grain growth of a recrystallized ferrite phase to form a fine ferrite phase. A high element concentration portion obtained in the primary annealing is formed into fine austenite to obtain a microstructure including the fine ferrite phase, the retained austenite phase, and the martensite phase. In the tempering step, the martensite phase is tempered to form a tempered martensite phase. The details will be described below.

4-2) Primary Annealing Step

Annealing Temperature (T1): ($Ac_1$−20° C.) or Higher and $Ac_3$ or Lower

When the annealing temperature is lower than ($Ac_1$−20° C.), as an austenite phase is not formed, the concentration of elements does not occur. In addition, excessively fine carbides are formed, and, for example, an unrecrystallized microstructure is left in the secondary annealing step, thereby failing to obtain the microstructure of the steel sheet of the disclosed embodiments. When the annealing temperature is higher than $Ac_3$, as a large amount of an austenite phase is formed, the concentration of elements does not occur. In addition, carbides are redissolved, and an unrecrystallized microstructure is left in the secondary annealing step, thereby failing to obtain the microstructure of the steel sheet of the disclosed embodiments. Accordingly, the annealing temperature is ($Ac_1-20°$ C.) or higher and $Ac_3$ or lower. The lower limit of the annealing temperature is preferably ($Ac_1-10°$ C.) or higher. The upper limit is preferably ($Ac_1+60°$ C.) or lower and more preferably ($Ac_1+40°$ C.) or lower. However, the specified preferable range holds true only if $Ac_1+60°$ C. or $Ac_1+40°$ C. is $Ac_3$ or lower.

In the disclosed embodiments, $Ac_3$ is determined from an inflection point in expansion with a Formaster. In the disclosed embodiments, $Ac_3$ is determined from an inflection point so expansion with the Formaster.

Holding Time of 10 Minutes or More at Annealing Temperature (T1)

A holding time less than 10 minutes at the annealing temperature results in an insufficient concentration of elements in an austenite phase and insufficient formation and growth of carbides. Thus, for example, an unrecrystallized microstructure is left in the secondary annealing step, thereby failing to obtain the microstructure of the steel sheet of the disclosed embodiments. Accordingly, the holding time at the annealing temperature is 10 minutes or more. The upper limit is not particularly specified and is preferably about 72 hours or less in view of productivity and so forth.

After the annealing under the foregoing conditions, cooling is performed to room temperature. Cooling means and the cooling rate are not particularly limited and may be appropriately determined.

4-3) Cold-Rolling Step

Cumulative Rolling Reduction: More Than 20%

In the cold rolling at a cumulative rolling reduction of 20% or less, coarse grains and an unrecrystallized microstructure are liable to be formed in the subsequent secondary annealing, thereby failing to the microstructure of the disclosed embodiments. Accordingly, the cumulative rolling reduction in the cold rolling is more than 20% and preferably 30% or more. The upper limit is not particularly specified and is preferably about 90% or less and more preferably 75% or less in view of the stability of the form of the sheet.

4-4) Secondary Annealing Step

Average Heating Rate: 10° C./or Less

An average heating rate of more than 10° C./s results in the formation of a coarse austenite phase, and, for example, an unrecrystallized microstructure is left, thereby failing to the microstructure of the steel sheet of the disclosed embodiments. Accordingly, the average heating rate is 10° C./s or less. The average heating rate is a value obtained by dividing the temperature difference between T2 and 200° C. by the heating time it takes for the temperature to increase from 200° C. to temperature T2. In the disclosed embodiments, the symbol "s" used as the unit of each of the average heating rate, the average cooling rate, and the holding time refers to "seconds".

Annealing Temperature (T2): Higher Than $Ac_1$ and $Ac_3$ or Lower (Provided That T2 >T1)

An annealing temperature of $Ac_1$ or lower results in insufficient formation of an austenite phase, thereby failing to the microstructure of the steel sheet of the disclosed embodiments. An annealing temperature of higher than $Ac_3$ results in excessive formation of the austenite phase, thereby failing to the microstructure of the steel sheet of the disclosed embodiments. Furthermore, if annealing temperature T2 is equal to or lower than annealing temperature T1, an unrecrystallized microstructure is left, thereby failing to the microstructure of the steel sheet of the disclosed embodiments. Accordingly, the annealing temperature is higher than $Ac_1$ and Ac.or lower (provided that T2 >T1), preferably higher than $Ac_1$ and ($Ac_1+80°$ C.) or lower (provided that T2 >T1), and more preferably higher than $Ac_1$ and ($Ac_1+60°$ C.) or lower (provided that T2 >T1). However, the specified preferable range holds true only if $Ac_1+80°$ C. or $Ac_1+60°$ C. is equal to or lower than $Ac_3$.

Holding Time of 30 s or More and 600 s or Less at Annealing Temperature (T2)

An annealing holding time of less than 30 s results in insufficient formation of an austenite phase and allows an unrecrystallized microstructure to be left, thereby failing to the microstructure of the steel sheet of the disclosed embodiments. An annealing temperature of more than 600 s results in the formation of a coarse ferrite phase, thereby failing to the microstructure of the steel sheet of the disclosed embodiments. Accordingly, the annealing holding time is 30 s or more and 600 s or less and preferably 30 s or more and 300 s or less.

Average Cooling Rate: 1.0° C./s or More

When the average cooling rare is less than 1.0° C./s at temperatures from the annealing temperature to the cooling stop temperature, large amounts of an ferrite phase and a pearlite phase are formed during cooling, thereby failing to the microstructure of the steel sheet of the disclosed embodiments. Accordingly, the average cooling rate is 1.0° C./s or more. The upper limit of the average cooling rate is not particularly limited, may be appropriately adjusted, and is preferably 100° C./s or less. The average cooling rate is a value obtained by dividing the difference between T2 and the cooling stop temperature by the cooling time it takes for the temperature to drop from T2 to the cooling stop temperature.

Cooling Stop Temperature: 460° C. or Higher and 550° C. or Lower

When the cooling stop temperature at an average cooling rate of 1.0° C./s or more is lower than 460° C., a large amount of a bainite phase is formed, thereby failing to the microstructure of the steel sheet of the disclosed embodiments. When the cooling stop temperature is higher than 550° C., large amounts of a ferrite phase and a pearlite phase are formed, thereby failing to the microstructure of the steel sheet of the disclosed embodiments. Accordingly, cooling stop temperature is 460° C. or higher and 550° C. or lower.

Cooling Stop Holding Time: 500 s or Less

A cooling stop holding time more than 500 s results in the formation of large amounts of a bainite phase and a pearlite phase, thereby failing to the microstructure of the steel sheet of the disclosed embodiments. Accordingly, the cooling stop holding time is 500 s or less. The lower limit of the cooling stop holding time is not particularly limited and may be appropriately adjusted. The cooling stop holding time may be zero. The term "cooling stop holding time" used here refers to the time from cooling to 550° C. or lower after annealing to immersion in a galvanizing bath. The temperature at the time of the stoppage of the cooling need not be exactly maintained after the stoppage of the cooling. Cooling and heating may be performed as long as the temperature range is 460° C. or higher and 550° C. or less.

4-5) Galvanization Step

Galvanization treatment is preferably performed by dipping the cold-rolled steel sheet that has been produced as described above in a galvanizing bath with a temperature of 440° C. or higher and 500° C. or lower and then adjusting the coating weight by, for example, gas wiping. When the galvanized layer is alloyed, the alloying is preferably performed by holding the galvanized steel sheet at a temperature range of 460° C. or higher and 580° C. or lower for 1 s or more and 120 s or less. In the galvanization, the galvanizing bath having an Al content of 0.08% or more by mass and 0.25% or less by mass is preferably used.

The steel sheet that has been subjected to galvanization may be subjected to any of various coating treatments, such as resin coating and oil/fat coating.

4-6) Tempering Step

Tempering Temperature: 50° C. or Higher and 400° C. or Lower

A tempering temperature of lower than 50° C. results in Insufficient tempering of the martensite phase, thereby failing to the microstructure of the steel sheet of the disclosed embodiments. A tempering temperature of higher than 400° C. results in the decomposition of the austenite phase, thereby failing to the microstructure of the steel sheet of the disclosed embodiments. Accordingly, the tempering temperature is 50° C. or higher and 400° C. or lower. The lower limit of the tempering temperature is preferably 100° C. or higher. The upper limit is preferably 350° C. or lower. The tempering treatment may be performed with any of a continuous annealing furnace, a box annealing furnace, and so forth. When the steel sheet is subjected to tempering treatment in the form of a coil, that is, when the steel sheet is in contact with itself, the tempering time is preferably 24 hours or less in view of, for example, the inhibition of adhesion.

4-7) Temper Rolling Step

Elongation Rate: 0.05% or More and 1.00% or Less

In the disclosed embodiments, temper rolling may be performed at an elongation rate of 0.05% or more and 1.00% or less before and/or after the tempering step. This temper rolling increases the yield strength (YS). The effect is provided at an elongation rate of 0.05% or more. An elongation rate elongation rate more than 1.00% might result in a reduction in uniform elongation. Accordingly, when the temper rolling step is performed, the elongation rate in the temper rolling is 0.05% or more and 1.00% or less.

EXAMPLES

Examples will be described below. The technical scope of the disclosed embodiments is not limited to the following examples. Table 2-1 and Table 2-2 are collectively referred to as Table 2. Table 3-1 and Table 3-2 are collectively referred to as Table 3.

Molten steels having chemical compositions listed in Table 1 were formed in a vacuum melting furnace and rolled into steel slabs. N in Table 1 is an inevitable impurity. Under conditions listed in Table 2, these steel slabs were subjected to heating, rough rolling, finish rolling, cooling, and a process equivalent to coiling to provide hot-rolled steel sheets. Each of the hot-rolled steel sheets was subjected to primary annealing and cold rolling to 1.4 mm to provide a cold-rolled steel sheet, followed by secondary annealing. The cold-rolled steel sheet was subjected to galvanization (with a galvanizing bath containing an Al content of 0.08% or more by mass and 0.25% or less by mass), cooling to room temperature, and tempering treatment. In some cases, temper rolling was performed before and/or after tempering treatment. Steel sheets 1 to 38 were produced under those conditions. The secondary annealing was performed in a laboratory with a simulated continuous galvanizing line under conditions listed in Table 2 to produce galvanized steel sheets (GI) and galvannealed steel sheets (GA). The galvanized steel sheets were produced by dipping the steel sheets in a galvanizing bath with a temperature of 460° C. to form a coated layer at a coating weight of 35 to 45 g/m². The galvannealed steel sheets were produced by performing galvanization and then galvannealing in the range of 460° C. to 580° C. The tensile properties, the bendability, and the impact resistance of the resulting galvanized and galvannealed steel sheets were determined according to the following test methods. Table 3 lists the results.

<Tensile Test>

A JIS No. 5 test piece for a tensile test (JIS Z 2201) was taken from each of the steel sheets that had been subjected to a final production step, in a direction perpendicular to a rolling direction. A tensile test according to JIS Z 2 2241 was performed at a strain rate of $10^{-3}$/s to determine the tensile strength (TS), the yield strength (YS), and the uniform elongation (UEL). A steel sheet having a tensile strength (TS) of 1180 MPa or more, a yield strength (YS) of 850 MPa or more, and a uniform elongation (UEL) of 6.5% or more was rated pass.

<Bending Test>

A test piece having a width of 35 mm and a length of 100 mm was taken from each of the steel sheets that had been subjected to the final production step in such a manner that a direction parallel to the rolling direction was the direction of a bending axis for the test, and was subjected to a bending test. Specifically, a 90° V-bending test was performed at stroke speed of 10 mm/s, a pressing load of 10 tons, a press-holding time of 5 s, and a bending radius R of 2.0 mm. A ridge portion at the apex of the resulting bend was observed using a magnifier with a magnification of ×10. At one point in the width direction, a steel sheet in which a crack having a length of 0.5 mm was formed was rated poor, and a steel sheet in which a crack having a length less than 0.5 mm was formed was rated good.

<Impact Test>

A strip test piece having a width of a parallel portion of 5 mm and a length of 7 mm was taken from each of the annealed sheets, in a direction perpendicular to the rolling direction. Absorbed energy up to an amount of strain of (5% AE) was evaluated when a tensile test was performed at a strain rate of 2000/s ("Tetsu to Hagane (Iron and Steel)", vol. 83 (1997), p. 748). A steel sheet having a ratio (5% AE/TS) of the absorbed energy up to an amount of strain of 5% at a strain rate of 2000/s to the static tensile strength (TS) of 0.050 or more was rated good in impact resistance. The absorbed energy was determined by integrating a stress-true strain curve in the range where the amount of strain was 0% to 5%.

TABLE 1

| | Chemical composition (% by mass) | | | | | | | | | | | $Ac_1$ | $Ac_3$ | Remarks (DE: Disclosed |
|---|---|---|---|---|---|---|---|---|---|---|---|---|---|---|
| Steel | C | Si | Mn | P | S | Al | N | Nb | Ti | V | Mo | Others | (° C.) | (° C.) | Embodiments |
| A | 0.18 | 1.90 | 2.5 | 0.015 | 0.0021 | 0.035 | 0.001 | 0.020 | — | — | — | — | 749 | 841 | within scope of DE |
| B | 0.16 | 1.00 | 2.8 | 0.008 | 0.0019 | 0.026 | 0.002 | — | 0.030 | — | — | — | 727 | 807 | within scope of DE |

TABLE 1-continued

| Steel | Chemical composition (% by mass) | | | | | | | | | | | | $Ac_1$ (°C.) | $Ac_3$ (°C.) | Remarks (DE: Disclosed Embodiments) |
| | C | Si | Mn | P | S | Al | N | Nb | Ti | V | Mo | Others | | | |
| --- | --- | --- | --- | --- | --- | --- | --- | --- | --- | --- | --- | --- | --- | --- | --- |
| C | 0.22 | 1.50 | 2.7 | 0.012 | 0.0011 | 0.033 | 0.002 | — | — | 0.100 | — | — | 730 | 808 | within scope of DE |
| D | 0.20 | 0.80 | 2.6 | 0.011 | 0.0008 | 0.017 | 0.003 | — | — | — | 0.200 | — | 731 | 787 | within scope of DE |
| E | 0.20 | 1.30 | 3.0 | 0.018 | 0.0010 | 0.035 | 0.003 | 0.010 | — | — | 0.050 | Cr:0.60 | 740 | 788 | withins cope of DE |
| F | 0.17 | 1.60 | 3.0 | 0.022 | 0.0032 | 0.025 | 0.001 | — | 0.015 | — | — | B:0.0015 | 734 | 819 | within scope of DE |
| G | 0.17 | 1.20 | 3.5 | 0.004 | 0.0014 | 0.300 | 0.003 | 0.015 | 0.020 | — | — | Ni:0.30 | 672 | 838 | within scope of DE |
| H | 0.19 | 1.70 | 2.7 | 0.008 | 0.0018 | 0.030 | 0.002 | — | 0.010 | — | 0.200 | Cu:0.20 | 739 | 829 | within scope of DE |
| I | 0.18 | 1.80 | 2.7 | 0.013 | 0.0020 | 0.040 | 0.003 | — | — | 0.050 | 0.100 | Ca:0.002 | 740 | 835 | within scope of DE |
| J | 0.16 | 1.40 | 3.2 | 0.013 | 0.0050 | 0.038 | 0.002 | 0.030 | 0.015 | 0.050 | — | REM:0.002 | 732 | 809 | within scope of DE |
| K | 0.14 | 1.20 | 2.5 | 0.015 | 0.0011 | 0.022 | 0.003 | 0.010 | — | — | — | — | 735 | 817 | outside scope of DE |
| L | 0.27 | 1.50 | 3.5 | 0.020 | 0.0009 | 0.032 | 0.004 | — | 0.020 | — | — | — | 723 | 773 | outside scope of DE |
| M | 0.18 | 0.30 | 2.7 | 0.019 | 0.0019 | 0.035 | 0.003 | — | — | 0.050 | — | — | 713 | 763 | outside scope of DE |
| N | 0.20 | 1.60 | 2.2 | 0.016 | 0.0013 | 0.015 | 0.002 | — | — | — | 0.100 | — | 745 | 828 | outside scope of DE |
| O | 0.21 | 0.60 | 2.9 | 0.015 | 0.0022 | 2.600 | 0.003 | — | 0.020 | — | — | — | 721 | 1272 | outside scope of DE |
| P | 0.16 | 1.00 | 2.8 | 0.015 | 0.0015 | 0.035 | 0.002 | — | — | — | — | — | 721 | 804 | outside scope of DE |
| Q | 0.16 | 1.00 | 2.8 | 0.015 | 0.0015 | 0.035 | 0.002 | 0.150 | — | — | — | — | 745 | 845 | outside scope of DE |
| R | 0.16 | 1.00 | 2.8 | 0.015 | 0.0015 | 0.035 | 0.002 | — | 0.150 | — | — | — | 729 | 850 | outside scope of DE |
| S | 0.16 | 1.00 | 2.8 | 0.015 | 0.0015 | 0.035 | 0.002 | — | — | 1.500 | — | — | 698 | 938 | outside scope of DE |
| T | 0.16 | 1.00 | 2.8 | 0.015 | 0.0015 | 0.035 | 0.002 | — | — | — | 2.500 | — | 733 | 897 | outside scope of DE |

TABLE 2-1

| Steel sheet No. | Steel | Hot-rolling conditions | | | Primary annealing | | Cold-rolling conditons Cumulative rolling reduction (%) | Secondary (final annealing) conditions | | | | | | | Coating conditions | | | | Temper rolling after coating Elongation rate (%) | Tempering conditions | | Temper rolling after tempering Elongation rate (%) | Remarks |
|---|---|---|---|---|---|---|---|---|---|---|---|---|---|---|---|---|---|---|---|---|---|---|
| | | Slab heating temperature (°C) | Finish rolling temperature (°C) | Coiling temperature (°C) | Annealing temperature (°C) | Annealing time (min) | | Average heating rate (°C/s) | Annealing temperature (°C) | Annealing holding time (s) | Average cooling rate (°C/s) | Cooling stop temperature (°C) | Cooling stop holding time (s) | Coating bath temperature (°C) | Alloying temperature (°C) | Alloying holding time (s) | Coated state* | | Tempering temperature (°C) | Tempering time (s) | | |
| 1 | A | 1200 | 890 | 450 | 740 | 30 | 56 | 4 | 750 | 180 | 10 | 500 | 60 | 465 | 570 | 25 | GA | — | 250 | 7200 | — | Example |
| 2 | | 1200 | 890 | 450 | 650 | 30 | 56 | 4 | 750 | 180 | 10 | 500 | 60 | 465 | 570 | 25 | GA | — | 250 | 7200 | — | Comparative example |
| 3 | | 1200 | 890 | 450 | 850 | 30 | 56 | 4 | 750 | 180 | 10 | 500 | 60 | 465 | 570 | 25 | GA | — | 250 | 7200 | — | Comparative example |
| 4 | | 1200 | 890 | 450 | 740 | 1 | 56 | 4 | 750 | 180 | 10 | 500 | 60 | 465 | 570 | 25 | GA | — | 250 | 7200 | — | Comparative example |
| 5 | | 1200 | 890 | 450 | 740 | 30 | 56 | 30 | 750 | 180 | 10 | 500 | 60 | 465 | 570 | 25 | GA | — | 250 | 7200 | — | Comparative example |
| 6 | B | 1200 | 900 | 500 | 720 | 600 | 50 | 5 | 740 | 60 | 8 | 460 | 30 | 465 | — | — | GI | — | 200 | 4800 | — | Example |
| 7 | | 1200 | 900 | 500 | 720 | 600 | 50 | 5 | 700 | 60 | 8 | 460 | 30 | 465 | — | — | GI | — | 200 | 4800 | — | Comparative example |
| 8 | | 1200 | 900 | 650 | 720 | 600 | 50 | 5 | 740 | 60 | 8 | 460 | 300 | 465 | — | — | GI | — | 200 | 4800 | — | Comparative example |
| 9 | | 1200 | 900 | 500 | 720 | 600 | 10 | 5 | 740 | 60 | 8 | 460 | 30 | 465 | — | — | GI | — | 200 | 4800 | — | Comparative example |
| 10 | | 1200 | 900 | 500 | 720 | 600 | 50 | 5 | 820 | 60 | 8 | 480 | 30 | 465 | — | — | GI | — | 200 | 4800 | — | Comparative example |
| 11 | C | 1200 | 850 | 450 | 750 | 120 | 56 | 2 | 760 | 300 | 15 | 480 | 10 | 465 | 580 | 15 | GA | 0.10 | 200 | 72000 | — | Example |
| 12 | | 1200 | 850 | 450 | 750 | 120 | 56 | 2 | 740 | 300 | 15 | 480 | 10 | 465 | 580 | 15 | GA | 0.10 | 200 | 72000 | — | Comparative example |
| 13 | | 1200 | 850 | 450 | 750 | 120 | 56 | 2 | 760 | 10 | 15 | 480 | 10 | 465 | 580 | 15 | GA | 0.10 | 200 | 72000 | — | Comparative example |
| 14 | | 1200 | 850 | 450 | 750 | 120 | 56 | 2 | 760 | 300 | 0.5 | 480 | 10 | 465 | 580 | 15 | GA | 0.10 | 200 | 72000 | — | Comparative example |
| 15 | D | 1200 | 840 | 400 | 740 | 60 | 50 | 9 | 750 | 120 | 30 | 500 | 30 | 465 | 520 | 20 | GA | — | 250 | 60 | — | Example |
| 16 | | 1200 | 840 | 400 | 740 | 60 | 50 | 9 | 750 | 120 | 30 | 400 | 30 | 465 | 520 | 20 | GA | — | 250 | 60 | — | Comparative example |

TABLE 2-1-continued

| Steel sheet No. | Steel | Hot-rolling conditions | | | Primary annealing | | Cold-rolling conditions Cumulative rolling reduction (%) | Secondary (final annealing) conditions | | | | | | Coating conditions | | | | Temper rolling after coating Elongation rate (%) | Tempering conditions | | Temper rolling after tempering Elongation rate (%) | Remarks |
|---|---|---|---|---|---|---|---|---|---|---|---|---|---|---|---|---|---|---|---|---|---|---|
| | | Slab heating temperature (°C) | Finish rolling temperature (°C) | Coiling temperature (°C) | Annealing temperature (°C) | Annealing time (min) | | Average heating rate (°C/s) | Annealing temperature (°C) | Annealing holding time (s) | Average cooling rate (°C/s) | Cooling stop temperature (°C) | Cooling stop holding time (s) | Coating bath temperature (°C) | Alloying temperature (°C) | Alloying holding time (s) | Coated state* | | Tempering temperature (°C) | Tempering time (s) | | |
| 17 | | 1200 | 640 | 400 | 740 | 60 | 50 | 9 | 750 | 120 | 30 | 500 | 900 | 465 | 520 | 20 | GA | — | 250 | 60 | — | Comparative example |
| 18 | E | 1200 | 900 | 550 | 750 | 3000 | 42 | 5 | 760 | 120 | 6 | 520 | 300 | 465 | — | — | GI | 0.20 | 300 | 10 | — | Example |
| 19 | | 1200 | 900 | 550 | 750 | 3000 | 42 | 5 | 760 | 120 | 6 | 520 | 300 | 465 | — | — | GI | — | 300 | 10 | 0.20 | Example |
| 20 | | 1200 | 900 | 550 | 750 | 3000 | 42 | 5 | 760 | 120 | 6 | 520 | 300 | 465 | — | — | GI | 0.20 | 40 | 10 | — | Comparative example |
| 21 | | 1200 | 900 | 550 | 750 | 3000 | 42 | 5 | 760 | 120 | 6 | 520 | 300 | 465 | — | — | GI | 0.20 | 450 | 10 | — | Comparative example |

*Coated state: GI: galvanized steel sheet, GA: galvannealed steel sheet

TABLE 2-2

| Steel sheet No. | Steel | Hot-rolling conditions | | | Primary annealing | | Cold-rolling conditons Cumulative rolling reduction (%) | Secondary (final annealing) conditions | | | | | | | Coating conditions | | | | Temper rolling after coating Elongation rate (%) | Tempering temperature (°C.) | Tempering time (s) | Temper rolling after tempering Elongation rate (%) | Remarks |
|---|---|---|---|---|---|---|---|---|---|---|---|---|---|---|---|---|---|---|---|---|---|---|
| | | Slab heating temperature (°C.) | Finish rolling temperature (°C.) | Coiling temperature (°C.) | Annealing temperature (°C.) | Annealing time (min) | | Average heating rate (°C./s) | Annealing temperature (°C.) | Annealing holding time (s) | Average cooling rate (°C./s) | Cooling stop temperature (°C.) | Cooling stop holding time (s) | Coating bath temperature (°C.) | Alloying temperature (°C.) | Alloying holding time (s) | Coated state* | | | | | |
| 22 | F | 1200 | 870 | 500 | 740 | 180 | 65 | 2 | 750 | 300 | 12 | 550 | 450 | 465 | 540 | 30 | GA | — | 150 | 7200 | — | Example |
| 23 | F | 1200 | 870 | 500 | 740 | 180 | 65 | 2 | 750 | 900 | 12 | 550 | 450 | 465 | 540 | 30 | GA | — | 150 | 7200 | — | Comparative example |
| 24 | F | 1200 | 870 | 500 | 740 | 180 | 65 | 2 | 750 | 300 | 12 | 600 | 450 | 465 | 540 | 30 | GA | — | 150 | 7200 | — | Comparative example |
| 25 | G | 1200 | 880 | 450 | 680 | 15 | 50 | 8 | 720 | 600 | 2 | 460 | 480 | 465 | 510 | 120 | GA | 0.30 | 350 | 2 | — | Example |
| 26 | H | 1200 | 880 | 450 | 760 | 300 | 36 | 3 | 770 | 120 | 15 | 500 | 180 | 465 | 550 | 40 | GA | — | 270 | 600 | — | Example |
| 27 | I | 1200 | 880 | 450 | 760 | 30 | 36 | 1 | 770 | 120 | 15 | 500 | 180 | 465 | 550 | 40 | GA | 0.10 | 200 | 36000 | — | Example |
| 28 | J | 1200 | 880 | 450 | 730 | 600 | 50 | 5 | 740 | 120 | 15 | 500 | 180 | 465 | 550 | 60 | GA | — | 250 | 7200 | 0.20 | Example |
| 29 | K | 1200 | 880 | 450 | 750 | 30 | 50 | 5 | 760 | 120 | 15 | 500 | 180 | 465 | 550 | 60 | GA | — | 300 | 120 | 0.20 | Comparative example |
| 30 | L | 1200 | 880 | 450 | 740 | 30 | 50 | 5 | 750 | 120 | 15 | 500 | 180 | 465 | 550 | 60 | GA | — | 300 | 120 | — | Comparative example |
| 31 | M | 1200 | 880 | 450 | 710 | 30 | 50 | 5 | 740 | 120 | 15 | 500 | 180 | 465 | 500 | 60 | GA | — | 300 | 120 | — | Comparative example |
| 32 | N | 1200 | 880 | 450 | 760 | 30 | 50 | 5 | 770 | 120 | 15 | 500 | 180 | 465 | 550 | 60 | GA | — | 300 | 120 | — | Comparative example |
| 33 | O | 1200 | 950 | 450 | 740 | 30 | 50 | 5 | 760 | 120 | 15 | 500 | 180 | 465 | 510 | 60 | GA | — | 300 | 120 | — | Comparative example |
| 34 | P | 1200 | 900 | 500 | 720 | 600 | 50 | 5 | 740 | 60 | 8 | 460 | 30 | 465 | 550 | 30 | GA | — | 200 | 600 | — | Comparative example |
| 35 | Q | 1200 | 900 | 500 | 750 | 600 | 50 | 5 | 800 | 60 | 8 | 460 | 30 | 465 | 550 | 30 | GA | — | 200 | 600 | — | Comparative example |
| 36 | R | 1200 | 900 | 500 | 720 | 500 | 50 | 5 | 750 | 60 | 8 | 460 | 30 | 465 | 550 | 30 | GA | — | 200 | 600 | — | Comparative example |

TABLE 2-2-continued

| Steel sheet No. | Steel | Hot-rolling conditions | | | Primary annealing | | Cold-rolling conditions Cumulative rolling reduction (%) | Secondary (final annealing) conditions | | | | | | Coating conditions | | | | Temper rolling after coating Elongation rate (%) | Tempering temperature (° C.) | Tempering time (s) | Temper rolling after tempering Elongation rate (%) | Remarks |
|---|---|---|---|---|---|---|---|---|---|---|---|---|---|---|---|---|---|---|---|---|---|---|
| | | Slab heating temperature (° C.) | Finish rolling temperature (° C.) | Coiling temperature (° C.) | Annealing temperature (° C.) | Annealing time (min) | | Average heating rate (° C./s) | Annealing temperature (° C.) | Annealing holding time (s) | Average cooling rate (° C./s) | Cooling stop temperature (° C.) | Cooling stop holding time (s) | Coating bath temperature (° C.) | Alloying temperature (° C.) | Alloying holding time (s) | Coated state* | | | | | |
| 37 | S | 1200 | 900 | 500 | 720 | 600 | 50 | 5 | 740 | 60 | 8 | 460 | 30 | 465 | 550 | 30 | GA | — | 200 | 600 | — | Comparative example |
| 38 | T | 1200 | 900 | 500 | 740 | 600 | 50 | 5 | 750 | 60 | 8 | 460 | 30 | 465 | 550 | 30 | GA | — | 200 | 600 | — | Comparative example |

*Coated state: GI: galvanized steel sheet. GA: galvanized steel sheet

TABLE 3-1

| Steel sheet No. | V(TM)*¹ (%) | V(F)*¹ (%) | V(γ)*¹ (%) | Others*¹ (%) | V(M)*¹ (%) | V(BF)*¹ (%) | d(TM)*² (m) | d(F)*² (m) | C(γ)*³ (%) | YS (MPa) | TS (MPa) | UEL (%) | Bend-ability | 5% AE*⁴ (MJ/m³) | 5% AE/TS | Remarks |
|---|---|---|---|---|---|---|---|---|---|---|---|---|---|---|---|---|
| 1 | 34 | 56 | 10 | 0 | 0 | 0 | 3 | 5 | 0.3 | 883 | 1243 | 9.9 | good | 68 | 0.055 | Example |
| 2 | 37 | 19 | 7 | 37 | 0 | 0 | 3 | 3 | 0.3 | 927 | 1251 | 6.5 | poor | 70 | 0.056 | Comparative example |
| 3 | 42 | 22 | 7 | 29 | 0 | 0 | 4 | 5 | 0.3 | 902 | 1278 | 6.4 | poor | 64 | 0.050 | Comparative example |
| 4 | 35 | 21 | 8 | 36 | 0 | 0 | 3 | 3 | 0.3 | 915 | 1246 | 6.8 | poor | 71 | 0.057 | Comparative example |
| 5 | 40 | 15 | 5 | 40 | 0 | 0 | 6 | 3 | 0.3 | 950 | 1293 | 6.4 | poor | 70 | 0.054 | Comparative example |
| 6 | 33 | 58 | 9 | 0 | 0 | 0 | 2 | 3 | 0.2 | 866 | 1222 | 9.5 | good | 67 | 0.055 | Example |
| 7 | 18 | 75 | 7 | 0 | 0 | 0 | 1 | 5 | 0.3 | 504 | 964 | 12.7 | good | 32 | 0.033 | Comparative example |
| 8 | 37 | 55 | 8 | 0 | 0 | 0 | 2 | 7 | 0.2 | 852 | 1185 | 9.4 | good | 57 | 0.048 | Comparative example |
| 9 | 35 | 0 | 8 | 57 | 0 | 0 | 5 | — | 0.3 | 918 | 1259 | 5.9 | good | 63 | 0.050 | Comparative example |
| 10 | 72 | 9 | 1 | 18 | 0 | 18 | 7 | 2 | 0.1 | 1127 | 1384 | 5.5 | poor | 95 | 0.069 | Comparative example |
| 11 | 44 | 45 | 11 | 0 | 0 | 0 | 3 | 3 | 0.4 | 1020 | 1332 | 9.9 | good | 82 | 0.062 | Example |
| 12 | 35 | 23 | 12 | 30 | 0 | 0 | 2 | 3 | 0.4 | 988 | 1297 | 6.8 | poor | 76 | 0.059 | Comparative example |
| 13 | 21 | 51 | 11 | 17 | 0 | 0 | 2 | 4 | 0.4 | 837 | 1172 | 7.2 | poor | 59 | 0.050 | Comparative example |
| 14 | 35 | 54 | 1 | 10 | 0 | 0 | 2 | 4 | 0.3 | 815 | 1183 | 6.6 | good | 54 | 0.046 | Comparative example |
| 15 | 40 | 50 | 8 | 2 | 0 | 0 | 2 | 2 | 0.5 | 891 | 1230 | 9.3 | good | 70 | 0.057 | Example |
| 16 | 20 | 48 | 5 | 27 | 0 | 25 | 1 | 2 | 0.6 | 799 | 1085 | 9.0 | good | 63 | 0.058 | Comparative example |
| 17 | 27 | 49 | 3 | 21 | 0 | 15 | 1 | 2 | 0.5 | 811 | 1132 | 8.8 | good | 60 | 0.53 | Comparative example |
| 18 | 54 | 37 | 9 | 0 | 0 | 0 | 2 | 2 | 0.6 | 1093 | 1324 | 9.6 | good | 92 | 0.069 | Example |
| 19 | 55 | 36 | 9 | 0 | 0 | 0 | 2 | 2 | 0.6 | 1086 | 1317 | 9.6 | good | 89 | 0.068 | Example |
| 20 | 2 | 37 | 8 | 53 | 53 | 0 | 1 | 2 | 0.1 | 899 | 1486 | 7.3 | poor | 46 | 0.031 | Comparative example |
| 21 | 54 | 37 | 1 | 8 | 0 | 0 | 2 | 2 | 0.1 | 1055 | 1192 | 6.0 | good | 93 | 0.078 | Comparative example |

*¹V(TM), V(F), V(γ), V(M), V(BF): Area fractions of a tempered martensite phase, a ferrite phase, a retained austenite phase, a martensite phase, and a bainitic ferrite phase, respectively. Others: Area fraction of phases including V(M), V(BF), and a phase other than the foregoing phases.

*²d(TM), d(F): Average grain size of tempered martensite phase and ferrite phase, respectively.

*³C(γ): C content of retained austenite phase

*⁴5% AE: Absorption energy up to 5%

TABLE 3-2

| Steel sheet No. | Steel structure | | | | | | | | | Mechanical properties | | | Bend-ability | 5% AE*4 (MJ/m³) | 5% AE/TS | Remarks |
|---|---|---|---|---|---|---|---|---|---|---|---|---|---|---|---|---|
| | V(TM)*1 (%) | V(F)*1 (%) | V(γ)*1 (%) | Others*1 (%) | V(M)*1 (%) | V(BF)*1 (%) | d(TM)*2 (m) | d(F)*2 (m) | C(γ)*3 (%) | YS (MPa) | TS (MPa) | UEL (%) | | | | |
| 22 | 40 | 51 | 9 | 0 | 0 | 0 | 3 | 2 | 0.2 | 860 | 1249 | 10.2 | good | 63 | 0.050 | Example |
| 23 | 41 | 51 | 8 | 0 | 0 | 0 | 3 | 9 | 0.2 | 852 | 1250 | 10.0 | good | 55 | 0.044 | Comparative example |
| 24 | 35 | 56 | 1 | 8 | 0 | 0 | 3 | 3 | 0.1 | 869 | 1213 | 6.1 | good | 66 | 0.054 | Comparative example |
| 25 | 36 | 55 | 9 | 0 | 0 | 0 | 1 | 2 | 0.5 | 921 | 1190 | 8.8 | good | 77 | 0.065 | Example |
| 26 | 45 | 45 | 10 | 0 | 0 | 0 | 3 | 2 | 0.5 | 965 | 1245 | 9.1 | good | 76 | 0.061 | Example |
| 27 | 39 | 51 | 10 | 0 | 0 | 0 | 2 | 2 | 0.3 | 936 | 1220 | 9.8 | good | 75 | 0.061 | Example |
| 28 | 40 | 55 | 5 | 0 | 0 | 0 | 2 | 2 | 0.4 | 890 | 1194 | 9.8 | poor | 70 | 0.059 | Example |
| 29 | 41 | 55 | 4 | 0 | 0 | 0 | 3 | 4 | 0.4 | 846 | 1153 | 8.9 | good | 63 | 0.055 | Comparative example |
| 30 | 42 | 42 | 15 | 1 | 0 | 0 | 4 | 3 | 0.4 | 966 | 1295 | 12.4 | poor | 71 | 0.055 | Comparative example |
| 31 | 56 | 43 | 1 | 0 | 0 | 0 | 2 | 2 | 0.4 | 913 | 1235 | 6.4 | good | 73 | 0.059 | Comparative example |
| 32 | 25 | 58 | 3 | 14 | 0 | 14 | 4 | 3 | 0.5 | 852 | 1149 | 7.2 | good | 65 | 0.057 | Comparative example |
| 33 | 13 | 72 | 15 | 0 | 0 | 0 | 2 | 13 | 0.4 | 740 | 1025 | 12.9 | poor | 40 | 0.039 | Comparative example |
| 34 | 35 | 54 | 11 | 0 | 0 | 0 | 4 | 6 | 0.3 | 858 | 1207 | 10.4 | good | 55 | 0.046 | Comparative example |
| 35 | 34 | 64 | 2 | 0 | 0 | 0 | 4 | 15 | 0.2 | 643 | 1125 | 10.7 | poor | 46 | 0.041 | Comparative example |
| 36 | 30 | 68 | 2 | 0 | 0 | 0 | 3 | 16 | 0.2 | 608 | 1068 | 12.1 | poor | 42 | 0.039 | Comparative example |
| 37 | 35 | 63 | 2 | 0 | 0 | 0 | 3 | 9 | 0.2 | 741 | 1139 | 9.4 | poor | 54 | 0.047 | Comparative example |
| 38 | 29 | 66 | 5 | 0 | 0 | 0 | 4 | 8 | 0.2 | 758 | 1156 | 9.2 | poor | 55 | 0.048 | Comparative example |

*1V(TM), V(F), V(γ), V(M), V(BF): Area fractions of a tempered martensite phase, a ferrite phase, a retained austenite phase, a martensite phase, and a bainitic ferrite phase, respectively.
Others: Area fraction of phases including V(M), V(BF), and a phase other than the foregoing phases.
*2d(TM), d(F): Average grain size of tempered martensite phase and ferrite phase, respectively.
*3C(γ): C content of retained austenite phase
*45% AE: Absorption energy up to 5%

Any of the high-strength galvanized steel sheets according to the examples of the disclosed embodiments have a tensile strength (TS) of 1180 MPa or more, a yield strength (YS) of 850 MPa or more, a uniform elongation of 6.5% or more, good bendability, and good impact resistance. In the comparative examples, which are outside the scope of the disclosed embodiments, a desired tensile strength (TS) is not obtained, a desired yield strength is not obtained, a desired uniform elongation is not obtained, a desired bendability is not obtained, or a desired impact resistance is not obtained.

INDUSTRIAL APPLICABILITY

According to the disclosed embodiments, a high-strength galvanized steel sheet having a tensile strength (TS) of 1180 MPa or more, a yield strength (YS) of 850 MPa or more, a uniform elongation of 6.5% or more, good bendability, and good impact resistance is provided. The use of the high-strength galvanized steel sheet of the disclosed embodiments for automobile parts contributes to a reduction in the weight of automobiles to markedly contribute to an increase in the performance of automobile bodies.

The invention claimed is:

1. A high-strength galvanized steel sheet having a chemical composition comprising, by mass %:

C: 0.15% or more and 0.25% or less;

Si: 0.50% or more and 2.5% or less;

Mn: 2.3% or more and 4.0% or less;

P: 0.100% or less;

S: 0.02% or less;

Al: 0.01% or more and 2.5% or less;

at least one element selected from the group consisting of Nb: 0.005% or more and 0.1% or less, Ti: 0.005% or more and 0.1% or less, V: 0.01% or more and 1.0% or less, and Mo: 0.005% or more and 2.0% or less; and the balance being Fe and inevitable impurities, wherein the steel sheet has a microstructure comprising, in terms of area fraction, a tempered martensite phase: 30% or more and 73% or less, a ferrite phase: 25% or more and 68% or less, a retained austenite phase: 2% or more and 15% or less, other phases: 10% or less (including 0%) in total, the other phases comprising, in terms of area fraction, a martensite phase: 3% or less (including 0%), and bainitic ferrite phase: 0%, the tempered martensite phase having an average grain size of 8 µm or less, the ferrite phase having an average grain size of 5 µm or less, and the retained austenite phase having a C content less than 0.7% by mass.

2. The high-strength galvanized steel sheet according to claim 1, wherein the galvanized steel sheet includes a galvannealed steel sheet.

3. The high-strength galvanized steel sheet according to claim 2, wherein the galvanized steel sheet has a tensile strength of 1180 MPa or more.

4. The high-strength galvanized steel sheet according to claim 1, wherein the galvanized steel sheet has a tensile strength of 1180 MPa or more.

5. The high-strength galvanized steel sheet according to claim 1, wherein the chemical composition further comprises at least one group selected from the group consisting of:

group A: by mass %, at least one element selected from the group consisting of Cr: 0.01% or more and 2.0% or less, Ni: 0.01% or more and 2.0% or less, and Cu: 0.01% or more and 2.0% or less, group B: by mass %, B: 0.0002% or more and 0.0050% or less, and group C: by mass %, at least one element selected from the group consisting of Ca: 0.001% or more and 0.005% or less and REM: 0.001% or more and 0.005% or less.

6. The high-strength galvanized steel sheet according to claim 5, wherein the galvanized steel sheet includes a galvannealed steel sheet.

7. The high-strength galvanized steel sheet according to claim 6, wherein the galvanized steel sheet has a tensile strength of 1180 MPa or more.

8. The high-strength galvanized steel sheet according to claim 5, wherein the galvanized steel sheet has a tensile strength of 1180 MPa or more.

\* \* \* \* \*